(No Model.)

E. HUNZIKER.
HAIR SPRING COLLET.

No. 359,786.  Patented Mar. 22, 1887.

WITNESSES:
Chas. Nida
C. Sedgwick

INVENTOR:
E. Hunziker
BY Munn & Co
ATTORNEYS.

UNITED STATES PATENT OFFICE.

EDWARD HUNZIKER, OF JERSEY CITY, NEW JERSEY, ASSIGNOR TO HIMSELF, AND EDWARD A. SWEET, OF BROOKLYN, N. Y.

HAIR-SPRING COLLET.

SPECIFICATION forming part of Letters Patent No. 359,786, dated March 22, 1887.

Application filed March 18, 1886. Serial No. 195,771. (No model.)

*To all whom it may concern:*

Be it known that I, EDWARD HUNZIKER, of Jersey City, in the county of Hudson and State of New Jersey, have invented a new and useful Improvement in Fastening Hair-Springs to Collets, of which the following is a full, clear, and exact description.

Reference is to be had to the accompanying drawings, forming a part of this specification, in which similar letters of reference indicate corresponding parts in all the figures.

Figure 1:
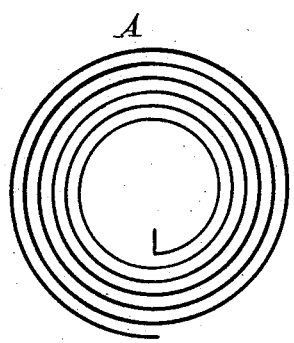
Figure 2:
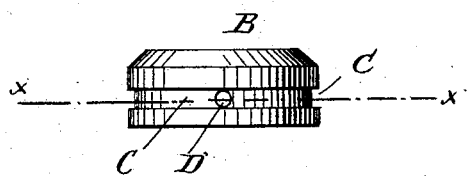
Figure 3:
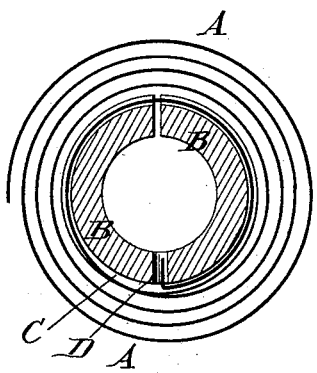

Figure 1 is a plan view of an ordinary hair-spring. Fig. 2 is a side elevation of a collet. Fig. 3 is a sectional plan view of the same, taken through the line $x$ $x$, Fig. 2, and showing the hair-spring in place thereon.

The object of this invention is to provide an improved method of fastening hair-springs to collets, by the use of which much time will be saved and annoyance avoided, as the hair-springs when applied to the collets will always take the proper position, will not require to be trued, and will be held securely in place without pinning.

The invention consists in the method of fastening hair-springs to collets, and in the construction of the collets, as will be hereinafter fully described.

A represents an ordinary hair-spring. B is a collet, which is made in the form of an open sleeve or collar, so that it will be securely held in place upon its post by friction in the ordinary manner.

Around the middle part of the collet B, and exactly at right angles with its axis, is formed an annular groove, C, to receive the inner coil of the hair-spring A. In the side of the collet B, and at the bottom of the groove C, is formed a perforation, D, to receive the inner end or point of the hair-spring A. The perforation D may extend partly or wholly through the wall of the collet B, may be of any desired shape, and should be of exactly the width of the inner end or point of the said hair-spring A.

In mounting the hair-spring, its point is inserted in the perforation D, and the inner coil is sprung into the groove C, where it will be held securely by the tension of the said spring.

The spring A will take automatically the correct position and will not require to be trued or pinned, so that much labor and annoyance will be saved to the workman and an increased elasticity will be given to the spring.

Having thus fully described my invention, what I claim as new, and desire to secure by Letters Patent, is—

1. The method of fastening hair-springs to collets, herein shown and described, which consists in placing the inner end of the hair-spring in a perforation in the side of the collet and placing the inner coil of the said hair-spring in an annular groove formed around the said collet, as set forth.

2. The hair-spring collet B, formed substantially as herein shown and described, with an annular groove around its middle part at right angles with its axis, and with a perforation, D, in its side at the bottom of the said groove, as set forth.

EDWARD HUNZIKER.

Witnesses:
F. J. BOESSE,
E. KOEHN.